B. H. TREWHELLA.
METALLIC ROPE FITTING.
APPLICATION FILED NOV. 1, 1912.
1,073,720.
Patented Sept. 23, 1913.
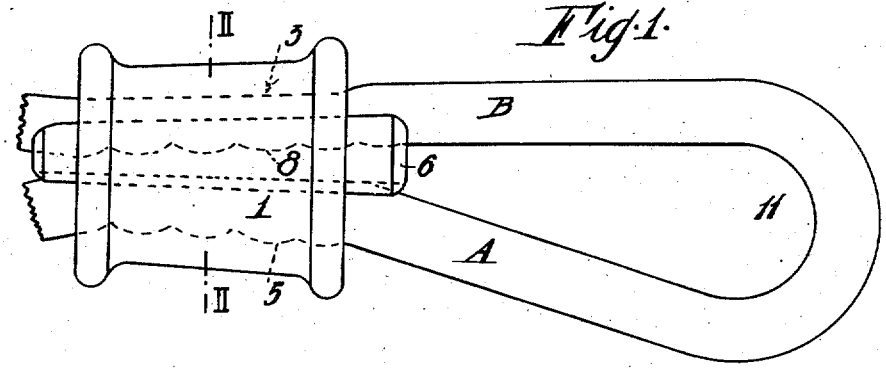
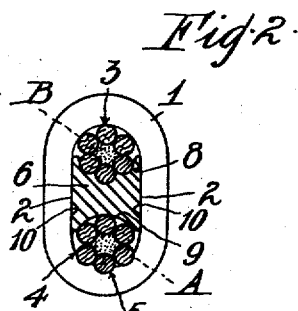
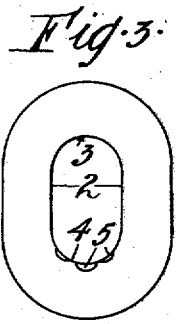
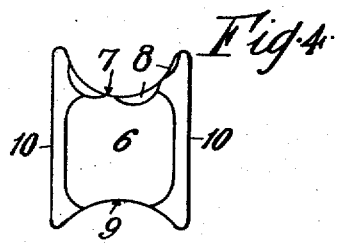
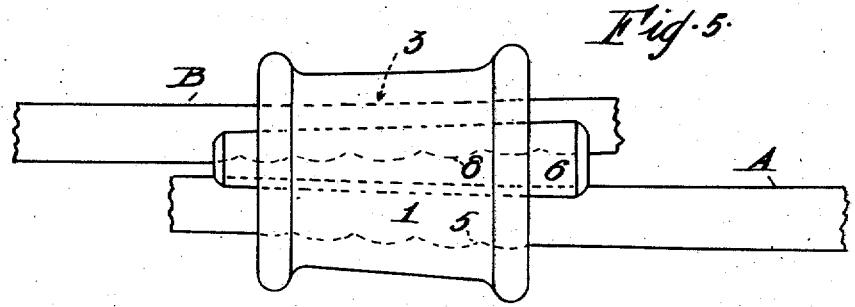
Witnesses:
P. Dommers
E. Leckert
Inventor.
Benjamin Hosking Trewhella,
by Henry Orth
atty.

UNITED STATES PATENT OFFICE.

BENJAMIN HOSKING TREWHELLA, OF BIRMINGHAM, ENGLAND.

METALLIC ROPE-FITTING.

1,073,720.  Specification of Letters Patent.  Patented Sept. 23, 1913.

Application filed November 1, 1912. Serial No. 729,060.

*To all whom it may concern:*

Be it known that I, BENJAMIN HOSKING TREWHELLA, a subject of the King of Great Britain, residing at No. 6 Alma street, Soho, Smethwick, Birmingham, England, engineer, have invented an Improved Metallic Rope-Fitting, of which the following is a specification.

This invention relates to wire ropes and metallic rope fittings employed for forming a loop in the end of a rope or for joining wire ropes or the ends of a rope, and consists in certain improvements whereby an efficient and inexpensive fitting is produced which may be readily attached in position.

The drawings illustrating the invention comprise—Figure 1 an elevation of the fitting as applied for forming a loop on the end of a rope, Fig. 2 a transverse section on line II—II, Fig. 1, Fig. 3 an end elevation of the fitting, and Fig. 4 an enlarged end view of the wedge. Fig. 5 is a similar view to Fig. 1 showing the fitting as applied for joining ropes.

According to this invention the fitting comprises a hollow metallic casing or band 1 having a longitudinal passage of an elongated or approximately elliptical shape in cross section, the interior of two opposite walls 2 being approximately parallel while the interior faces 3, 4, of the other two walls, which are rounded off to fit the rope portions A, B, are tapered.

One of the tapered interior faces (4) of the casing or band is formed with spiral grooves 5 into which the strands of one rope portion A is fitted, while the other tapered interior face 3 is smooth. The wedge 6 that is inserted between the rope portions A, B, is concave on one side 7 and formed with spiral grooves 8 to engage the strands of the other rope portion B, while its other opposite side 9 is concave to fit partially around the other rope portion A. The two remaining sides 10, 10, of the wedge conform to the approximately parallel interior faces 2, 2, of the casing or band.

When the fitting is in position on the rope portions, the wedge and casing will be forced to move with the rope portions which are engaged by the spiral grooves, while the rope portions are able to slide to a certain extent in the smooth concave parts of the wedge and casing.

It will be evident that when the rope or ropes is or are put in tension, that the fitting is tightened and a thoroughly satisfactory junction effected.

Fig. 1 shows the end of a rope turned back and gripped by means of the casing and wedge to form a loop 11, while Fig. 5 illustrates the manner in which the invention is employed to join two ropes or the ends of a rope.

I claim:—

1. A metallic rope fitting adapted to receive two rope portions consisting of an interiorly tapered casing or band formed in one tapered face only with spiral grooves to grip one rope portion and a wedge formed with spiral grooves on one side only to grip the other rope portion, substantially as and for the purpose specified.

2. A metallic rope fitting adapted to form a loop on the end of a rope, consisting of an interiorly tapered casing or band adapted to receive the two rope portions of the loop and formed in one tapered face only with spiral grooves to grip one of said rope portions and a wedge formed with spiral grooves on one side only to grip the other rope portion, substantially as and for the purpose specified.

3. A metallic rope fitting adapted to receive two rope portions, comprising a hollow metallic casing having a longitudinal passage elongated or approximately elliptical in cross section, said passage having two opposite rounded tapering interior faces and two approximately parallel faces, one rounded face being spirally grooved and the other smooth, and a wedge concave on two opposite sides and approximately parallel on the other sides, one of said concave sides being spirally grooved, and the other smooth, the smooth face being arranged in the casing opposite the spiral face of the latter.

In testimony whereof I have hereunto set my hand in presence of two subscribing witnesses.

BENJAMIN HOSKING TREWHELLA.

Witnesses:
WALTER ADAMS,
BENJAMIN TREWHELLA DRUMMOND.